United States Patent [19]
Zouzoulas

[11] 4,393,965
[45] Jul. 19, 1983

[54] ROTARY ACTUATOR

[75] Inventor: John Zouzoulas, Williamsville, N.Y.

[73] Assignee: Andco Actuator Products, Inc., Buffalo, N.Y.

[21] Appl. No.: 206,644

[22] Filed: Nov. 13, 1980

[51] Int. Cl.[3] .............................................. F16D 21/04
[52] U.S. Cl. .................................. 192/48.91; 74/625; 192/82 P; 192/95; 192/114 R; 192/DIG. 1
[58] Field of Search .................... 192/48.91, 82 P, 95, 192/114 R, DIG. 1; 74/625; 251/130

[56] References Cited

U.S. PATENT DOCUMENTS

| | | | |
|---|---|---|---|
| 2,694,320 | 11/1954 | Kron | 74/625 |
| 2,745,294 | 5/1956 | Kron | 74/625 |
| 3,168,841 | 2/1965 | Caldwell et al. | 192/48.91 |
| 3,198,033 | 8/1965 | Fry | 74/625 |
| 3,257,866 | 6/1966 | Fry | 74/625 |
| 3,279,276 | 10/1966 | Fry | 74/424.8 |
| 3,298,249 | 1/1967 | Nott | 74/625 |
| 3,383,948 | 5/1968 | Palmer et al. | 192/114 R |
| 3,585,867 | 6/1971 | Grimshaw | 74/424.8 |
| 3,603,175 | 9/1971 | Horton | 74/625 |
| 4,022,309 | 5/1977 | Denkowski et al. | 192/48.5 |
| 4,034,624 | 7/1977 | Bianchini | 192/48.91 X |
| 4,130,030 | 12/1978 | Stratienko | 192/48.91 X |

Primary Examiner—Rodney H. Bonck
Attorney, Agent, or Firm—LeBlanc, Nolan, Shur & Nies

[57] ABSTRACT

A rotary actuator having an output drive rod mounted within an output sleeve that is rotated by a drive motor. A driving mechanism for coupling the torque of the drive motor to the output sleeve includes a worm wheel that is mounted on the output sleeve so as to be freely rotatable relative to the output sleeve and a driving portion for transmitting power from the worm wheel to the output sleeve. A clutch also is mounted on the output sleeve for rotation with axial movement along the output sleeve. The clutch is normally biased into its first position for engagement with the drive portion of the drive mechanism for coupling it to the output sleeve for transmitting rotational force. A declutch mechanism causes the clutch to be moved of engagement with the drive portion, if the drive portion ceases to operate and the output sleeve is to be rotated by a hand wheel. When the clutch is moved out of engagement with the drive portion, it is moved into a coupling arrangement with the hand wheel for manually driving the clutch and transmitting a rotational force to the output sleeve. The clutch is retained in its second position until operation of the driving portion is resumed when the clutch is automatically returned to its position in engagement with the driving portion.

17 Claims, 10 Drawing Figures

ROTARY ACTUATOR

BACKGROUND OF THE INVENTION

The present invention relates to rotary actuators with clutching and declutch mechanisms that enable the output member to be rotated by a hand wheel whenever operation of the drive motor temporarily ceases.

The primary drive mechanism for the rotary actuator is an electrical drive motor. During utilization of the actuator, however, a secondary drive mechanism must be provided in case of the occurrence of a power failure, failure of the motor, or the need of manual adjustment. Often during the initial start-up of the valve that is being operated by the rotary actuator, it is desirable to be able to operate the actuator manually before placing the motor into operation. In order to accomplish all of these purposes, a secondary source of power, a hand wheel is provided for manually rotating the actuator.

A clutch mechanism and a declutch mechanism are provided for switching the rotary control of the actuator between the drive motor and the hand wheel. While both rotary actuators per se and clutching and declutch mechanisms incorporated in such actuators are well known in the art, the various devices that have been provided are relatively complex which increases both the cost of manufacturing and maintenence of such equipment.

Exemplary of the current state of the art of rotary actuators with declutch mechanisms in U.S. Pat. No. 4,022,309 to Denkowski et al. The valve operating mechanism disclosed by this patent includes both motor and manual drive devices for driving an externally threaded drive stem. The driving force is applied through a worm shaft and a worm to a worm gear. The worm gear has upstanding lugs that engage a pair of lugs that extend downwardly from a motor clutch ring. The clutch ring through a pair of detent rollers arranged within a plurality of corresponding slots drives a cup shaped drive ring that is positioned in the motor clutch ring. The lower portion of the drive ring is connected through splines to the drive sleeve. The drive sleeve in turn is internally threaded so as to be engaged with the externally threaded valve stem. When the motor power is either intentionally deactivated or a failure has occurred, the actuator mechanism can be declutched so as to switch between the motor mode of operation and a manual mode of operation. A crank or a lever can be manually rotated so as to turn a pinion declutch shaft. Secured to the declutch shaft is a pinion that has a fixed number of teeth arranged in engagement with circumferential grooves on a clutch sleeve. Arranged below the clutch sleeve is a lug ring. That lug ring is supported in an annular floor of a drive ring. The lug ring has a pair of opposing slots that are located to receive downwardly extending legs of the clutch sleeve. A pair of opposing lugs, which are spaced 180° apart, extend radially outwardly from the wall of the lug ring. Lugs are located in the upper half of the lug ring wall. In the lower part of the lug ring wall are a pair of recesses which serve to receive the detent rollers.

Numerous other patents disclose various embodiments of rotary actuators many of which have clutch and declutch mechanisms for alternatively coupling the output member to an electrical motor or a hand wheel. Exemplary of such actuators are those illustrated in the following U.S. Pat. Nos. 2,694,320 to Kron; 3,168,841 to Caldwell et al.; 3,198,033 to Fry; 3,257,866 to Fry; 3,279,376 to Fry; 3,298,249 to Nott; 3,585,867 to Grimshaw et al.; and 3,603,175 to Horton. In addition to the complexity of the clutch and declutch mechanism included within these patents, the layout of the systems renders it extremely difficult to replace the stem nut to which the threaded driving rod of the actuator is attached.

During utilization of the actuator, depending on the nature of the member to be controlled, various sized driving rods are employed. Within certain limits, the same actuator can be used with different sized threaded driving rods. In order to accomodate the different sized rods, the stem nut within the actuator that is rotated and transmits the rotary force to the driving rod can be changed. With the various actuators disclosed in the above-noted list of patents, however, in order to change the stem nut, the rotary actuator must be detached from the valve being controlled. In these actuators, access to the stem nut can only be obtained from the output side of the actuator.

For example, in the embodiments disclosed in U.S. Pat. No. 3,279,276 to Fry, the nut member is attached in such a manner so as to require the actuator to be removed in order to remove the nut member. More specifically, it is indicated that the nut member is arranged so as to abut the end surface of the output shaft. The output shaft has a sleeve with a flange thereon that engages beneath the flange of the nut member so as to maintain the nut member in engagement with the output shaft. Consequently in order to remove the nut member it is necessary to remove the actuator assembly so that the flange on the output shaft can be removed.

As another example, in U.S. Pat. No. 3,585,867 to Grimshaw et al. it is indicated that the driving engagement mechanism is engaged in a recess at the driving end of the output shaft. An output member is connected to the driving engagement mechanism so as to extend along the output shaft in one or the other direction. Since the driving engagement member is arranged within the recess at the bottom of the shaft, it is necessary to remove the entire shaft which is secured within the actuator in order to be able to remove the driving engagement mechanism, more particularly, the stem nut.

SUMMARY OF THE INVENTION

An object of the present invention is to provide an improved rotary actuator.

Another object of the present invention is to provide a rotary actuator with an improved clutching and declutching mechanism.

A further object of the present invention is to provide a rotary actuator with a simplified mechanism for enabling the stem nut to be removed from the actuator and replaced without having to remove the entire actuator, i.e. by merely removing the hand wheel portion of the actuator.

Still another object of the present invention is to provide an improved and simplified rotary actuator in which the stem nut can be rapidly and easily removed from the assembly with the use of a driver that forms a portion of the actuator assembly.

These objectives of the present invention are achieved in the utilization of a rotary actuator constructed in accordance with the present invention. The rotary actuator includes a drive motor that generates a torque for driving an output member to which an output drive rod is connected. A drive mechanism couples the drive motor to the output member that is to be rotated. The drive mechanism includes a worm wheel that is positioned around the output member and is freely rotatable relative to the output member. The worm wheel is arranged so as to be rotated by the drive motor. The driving mechanism also includes a driving portion for transmitting the power from the worm wheel to the output member. A clutch member is mounted on the output member for rotation with the output member. The clutch member, however, is axially movable along the output member. The clutch member serves to couple the output member to the drive portion of the drive mechanism when the clutch member is arranged in its first position. The clutch member is normally biased into such first position by a spring.

A declutch mechanism is provided for enabling the clutch member to be moved into a second position out of engagement with the drive portion of the drive mechanism if rotation of the drive portion ceases for any reason. The declutch mechanism is used when the output member is to be temporarily operated by the hand wheel due to the occurrence of either a failure of the drive motor or during certain initial start-up periods of operation before the drive motor is switched on. The hand wheel enables manual movement of the output member until the operation of the drive motor is resumed. A retaining mechanism retains the clutch member in its second position until resumption of rotation of the driving portion. The retaining mechanism includes a tripper member that rests upon the driving portion when the clutch member is in its second position. The driving portion includes a deactivating portion which automatically deactivates the clutch member upon resumption of rotation of the driving portion thereby enabling the clutch member to be returned to its first position by the force of the biasing spring.

The declutch mechanism includes a threaded pinion which engages a plurality of grooves on the clutch member. By rotating the pinion by a declutch knob or lever, the clutch member can be moved in an axial direction along the output member and out of engagement with the driving portion of the drive mechanism. As the declutch knob or lever is rotated so as to rotate the shaft on which the pinion is mounted, a tripper member also mounted on the shaft is similarly rotated. Once the pinion has been rotated sufficiently so as to move the clutch member out of engagement with the drive portion, the tripper is rotated into a position for resting upon the upper surface of the driving portion. The upper surface of the driving portion is provided with an eccentric cam. As long as the driving portion is not rotated, the tripper member remains in engagement with it. Once the operation of the drive motor is resumed, however, the driving portion is rotated and the eccentric cam forces the tripper member out of engagement with the driving portion. When the tripper member is kicked out of engagement, the declutch pinion is free to return to its original position. Since the clutch member is biased into its first position where it engages the drive portion, the clutch member is forced back into engagement with the driving portion simultaneously rotating the declutch pinion. Thus, resumption of the operation of the drive motor and hence the drive portion of the drive mechanism automatically returns the clutch mechanism to its first position in which the output member is then driven by the drive motor.

Extending from the rotary actuator is the output drive rod which is the member that is actually connected to the mechanism that is to be actuated, e.g. a valve flap. The output drive rod is mounted within the output member and extends from one longitudinal end of the output member. A coupling mechanism transmits the rotational movement of the output member to the output drive rod. The output drive rod is an externally threaded stem. The coupling mechanism includes an internally threaded stem nut through which the output drive rod passes so as to be in engagement with the stem nut. The coupling mechanism further includes a driver. The driver is connected to the output member in the stem nut so as to transmit power between such members. The output drive rod, the stem nut, the driver, the output member and a hand wheel for manually controlling such elements are all aligned so as to rotate about the same longitudinal axis. The hand wheel is coupled to the output member by a hand wheel adapter at the longitudinal end of the output member opposite the end from which the output drive rod extends. The hand wheel is connected to the clutch member by the hand wheel adapter when the clutch member is in its second position so that the clutch member then in turn couples the hand wheel to the output member. The stem nut is removable from the output member from the end of the output member where the hand wheel is attached. In order to remove the stem nut, the hand wheel and the hand wheel adapter must first be removed. Then the stem nut can be removed with the aid of the driver without any need to rotate the output drive rod. Once the stem nut is removed, it can be replaced with a stem nut having a different inner diameter of its internally threaded surface so as to accomodate a different output drive rod.

DESCRIPTION OF THE PREFERRED EMBODIMENTS

Figure 1:
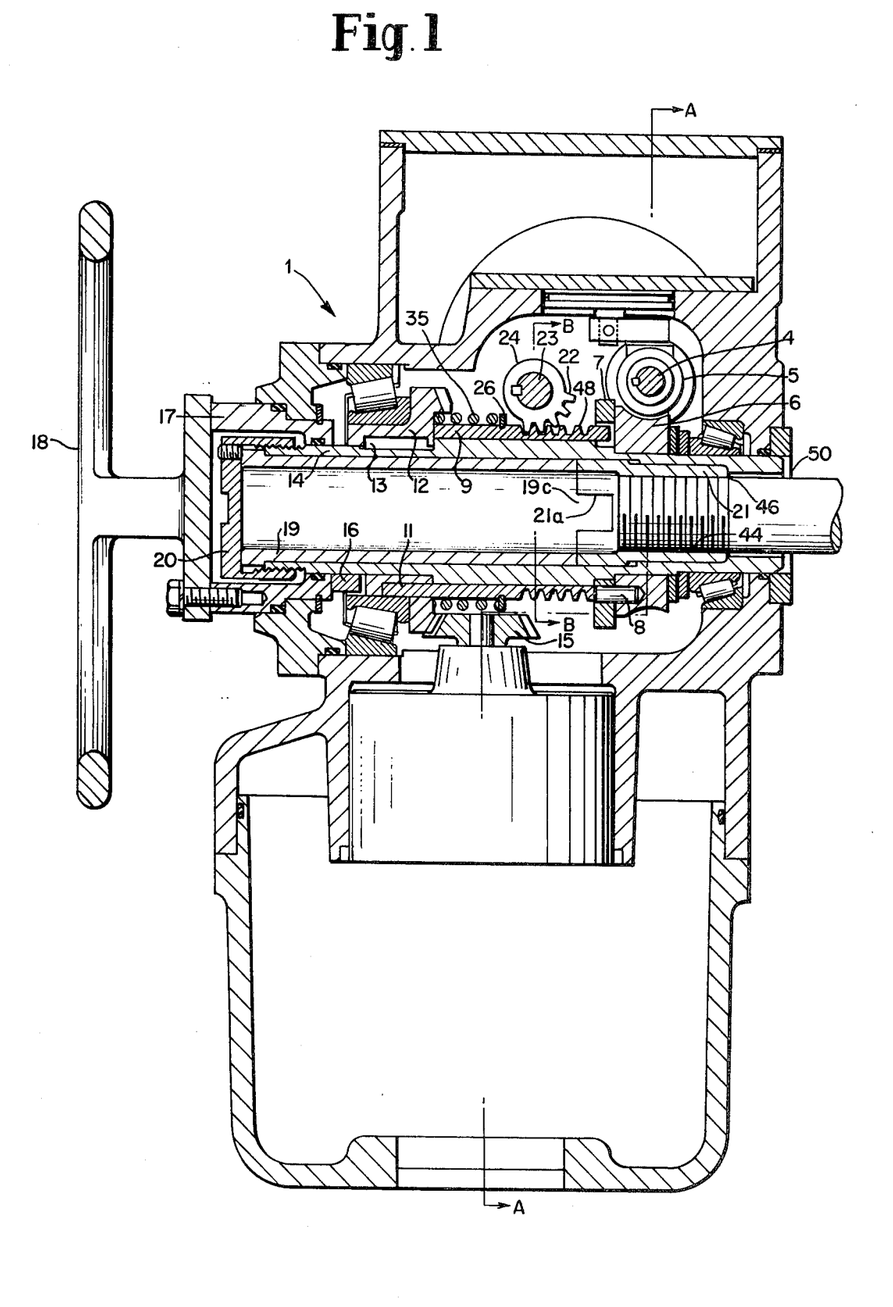
FIG. 1 is a cross-sectional side view of a rotary actuator mechanism in accordance with the present invention.
Figure 2:
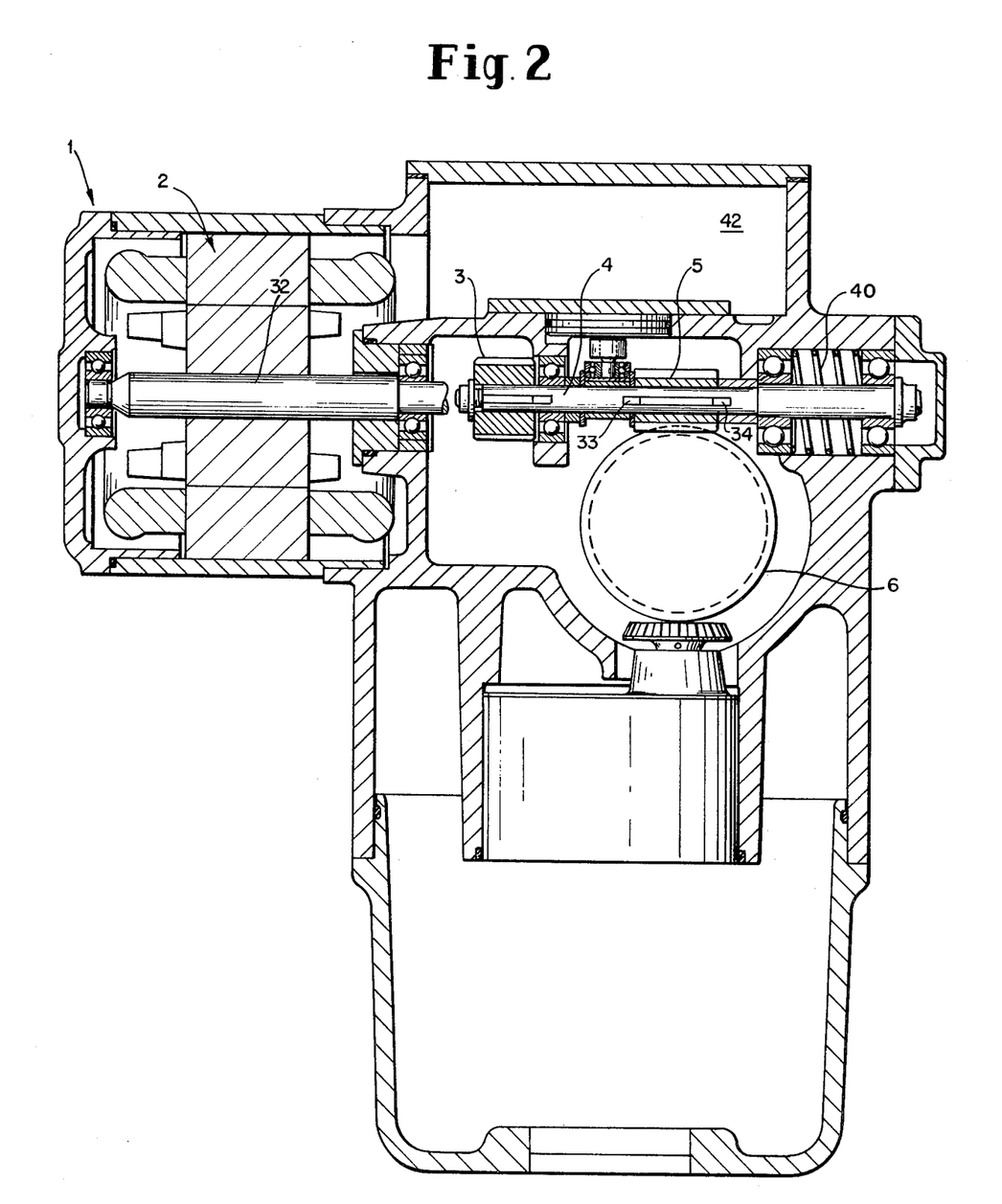
FIG. 2 is a cross-sectional view taken along lines A—A of FIG. 1.

A rotary actuator 1, such as shown in FIG. 1, is used for providing a rotational force to a drive rod which in turn is connected to a member, such as a valve that is to be rotated for opening and closing the orifice of the valve. The rotational force, i.e. the torque, for driving the drive rod can be provided by either an electric motor 2, such as shown in FIG. 2, or a hand wheel 18.

During normal operation, the electric drive motor 2 drives the valve in response to certain control signals so that the drive rod is rotated the desired degree. Such control mechanism for controlling the limits of rotation, which are referred to as torque switches, are known within the art. An example of an improved control mechanism that can be used in conjunction with the present rotary actuator is the mechanism disclosed in my copending application Ser. No. 122,849 entitled ACTUATOR ACTIVATED SWITCHING MECHANISM, filed Feb. 20, 1980.

Electric drive motor 2 has an output motor shaft 32 that rotates the drive gear 3. Drive gear 3 in turn rotates worm shaft 4. Mounted on worm shaft 4 for rotation therewith is a worm 5. Worm 5 is keyed to the worm shaft such as shown in FIG. 2 by lugs 33 and 34. Rotation of worm 5 causes rotation of worm gear 6 which is mounted on drive sleeve 14, such as shown in FIG. 1. In order to maintain the axial orientation of worm 5 in the appropriate location, a plurality coil springs 40, or disc springs are used. In controlling the operation of the electric motor in response to the rotational position of the drive rod, a torque switch arranged in space 42 can be used. This torque switch can be of the type disclosed in the above-mentioned copending application Ser. No. 122,849.

Figure 3:
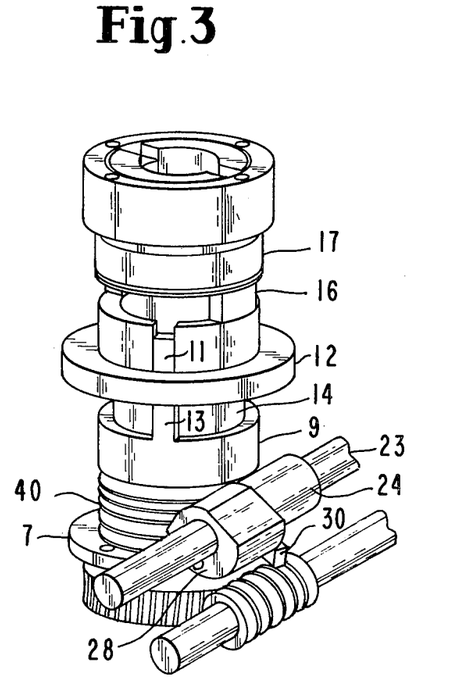
FIG. 3 is a perspective view of a portion of the rotary actuator illustrated in FIG. 1 and including the clutching and declutching mechanism of the present invention.
Figure 4:
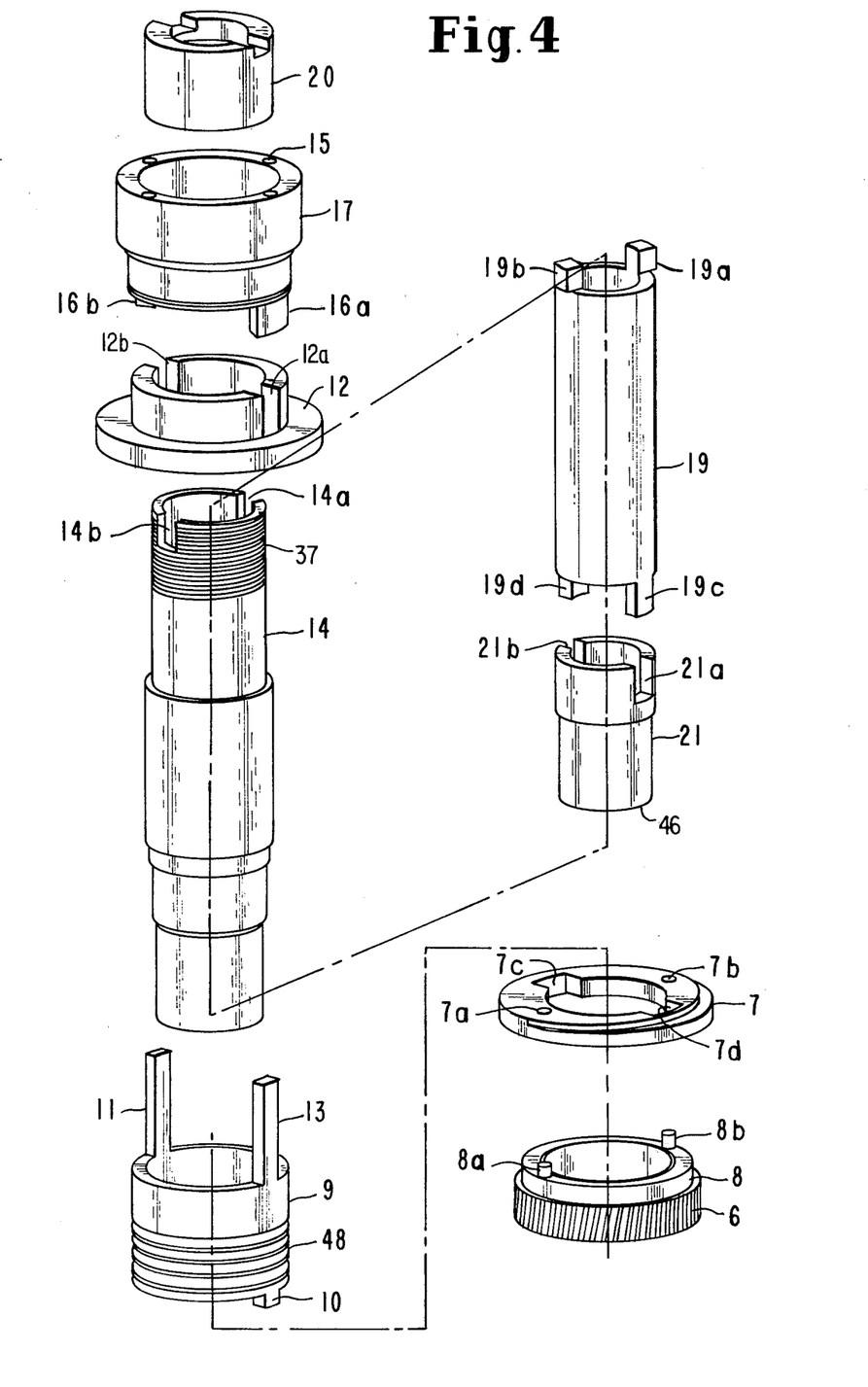
FIG. 4 is an exploded view of the elements illustrated in FIG. 3.

Returning to FIG. 1 in conjunction with FIGS. 3 and 4, it can be seen that drive sleeve 14 is the central core element of the driving mechanism for the drive rod. Mounted at the lower end of drive sleeve 14 is worm gear 6 and eccentric drive ring 7. While worm gear 6 is mounted on sleeve 14, it is freely rotatable with respect to sleeve 14. Eccentric drive ring 7 is connected to worm gear 6 through ring member 8 by pins 8a and 8b that extend through corresponding opening 7a and 7b. Mounted around sleeve 14 in a location immediately above eccentric drive ring 7 is clutch sleeve 9. Clutch sleeve 9 is axially movable along drive sleeve 14. Clutch sleeve 9 is biased by springs 35 into a first position where its two bottom lugs 10 engage eccentric drive ring 7 by resting in slots 7c and 7d in the eccentric drive ring. When clutch sleeve 9 is in the first position, it is rotated in conjunction with eccentric drive ring 7 and worm gear 6.

Mounted over and securely fastened to drive sleeve 14 is a bevel gear 12. Since bevel gear 12 and drive sleeve 14 are securely fastened to each other, rotation of bevel gear 12 will rotate drive sleeve 14. The rotational movement of clutch sleeve 9 is transmitted to bevel gear 12 by top lugs 11 and 13 which pass through slots 12a and 12b in bevel gear 12. When clutch sleeve 9 is in its first position so as to engage eccentric ring 7 the rotational driving force is provided by motor 2 through worm gear 6, eccentric ring 7 and clutch sleeve 9.

Clutch sleeve 9, alternatively, can be moved into a second position where it is disengaged from eccentric ring 7. Clutch sleeve 9 is moved into such second position by a declutching mechanism which will be described further below. When in its second position, clutch sleeve 9 is axially displaced in an upward direction along drive sleeve 14. In such second position top lugs 11 and 13 are contacted by lugs 16a and 16b of hand wheel adapter 17. Hand wheel adapter 17 in turn is attached to hand wheel 18. When clutch sleeve 9 is in its second position, rotation of hand wheel 18 will rotate lugs 16a and 16b which will transmit such rotational force to lugs 11 and 13 thereby rotating clutch 9 and bevel gear 12.

Mounted within drive sleeve 14 is a driver 19 which has top lugs 19a and 19b which rest within slots 14a and 14b of drive sleeve 14. The rotational movement of drive sleeve 14 is transmitted to driver 19 through lugs 19a and 19b. Arranged below driver 19 also within drive sleeve 14 is a stem nut 21. Stem nut 21 has an internally threaded surface 44 which is connected to an externally threaded drive rod of the valve which extends through drive sleeve 14. The externally threaded drive rod extends out of opening 46 in the bottom of stem nut 21 so as to extend from opening 50 in the actuator.

Stem nut 21 and driver 19 are securely held in place within drive sleeve 14 by a lock nut 20 which is internally threaded and is screwed onto threads 37 on the top end of drive sleeve 14.

In order to move clutch sleeve 9 into its second position, a declutch mechanism is provided. The declutch mechanism includes a declutch pinion 24 that is mounted on a declutch shaft 23. At outer end of declutch shaft 23 either a knob or lever 27 is mounted externally for rotating shaft 23 and hence rotating pinion 24. In the illustration of FIG. 3, pinion 24 is rotated in a clockwise direction when a declutching operation is to take place. Teeth 22 on pinion 24 mesh with the corresponding annular ribs 48 on clutch sleeve 9 such as shown in FIG. 1. By rotating pinion 24 clutch sleeve 9 is axially moved along drive sleeve 14 into its second position where it is disengaged from eccentric drive ring 7.

Depending upon the frequency and duty of the valve actuation, nut 21 normally suffers wear and is replaced two to three times before any other component of the actuator or the valve will fail. Consequently, a simple mechanical replacement of the nut is desirable. Unlike other designs of rotary valve actuators, the stem nut 21 on the rotary valve actuator of the present invention can be easily replaced, without the use of special tools and without dismounting the actuator from the valve. The various steps for removing the stem nut are illustrated in FIGS. 7a through 7d.

In order to remove stem nut 21, it is necessary to remove handwheel 18 and lock nut 20. Then, driver 19 is lifted upwardly until lugs 19a and 19b are disengaged from slots 14a and 14b of the drive sleeve 14. It should be noted, while lugs 19a and 19b are out of engagement with slots 14a and 14b, the downward lugs 19c and 19d of driver 19 are still engaged with slots 21a and 21b of nut 21. Rotation of driver 19 in a clockwise direction as shown by the arrows in FIG. 7d will rotate stem nut 21 which in turn will rotate over the valve stem until completely removed. A new stem nut may now be installed in the actuator following the above procedure in reverse. Once the nut is assembled in position shown on FIG. 1, the driver 19, lock nut 20 and handwheel 18 are re-installed.

Figure 5:
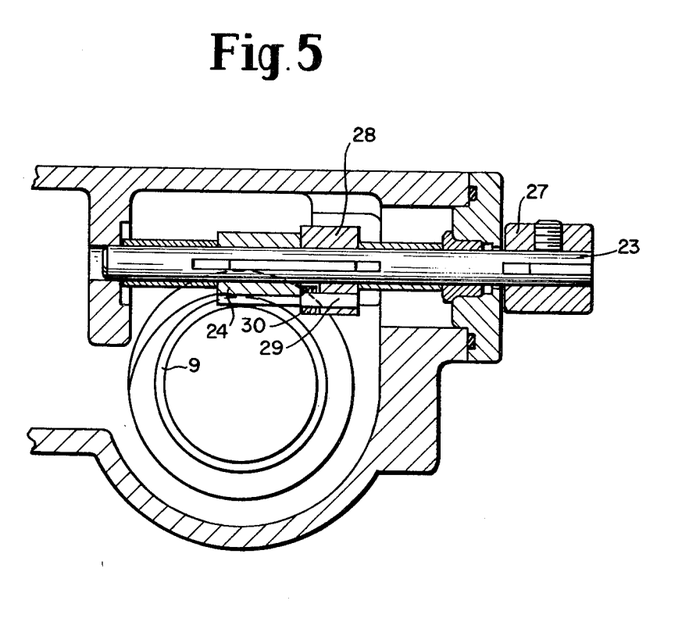
FIG. 5 is a sectional view along lines B—B of FIG. 1.
Figure 6:
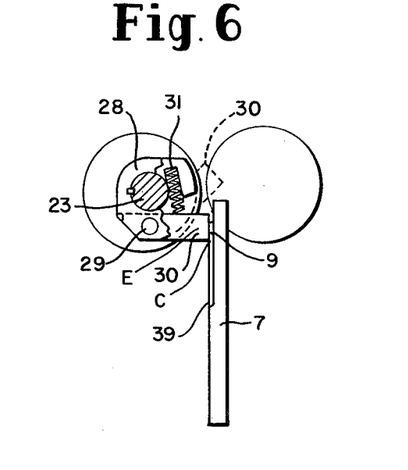
FIG. 6 is a side view of a portion of the declutching mechanism illustrated in FIG. 5.
Figure 7A:
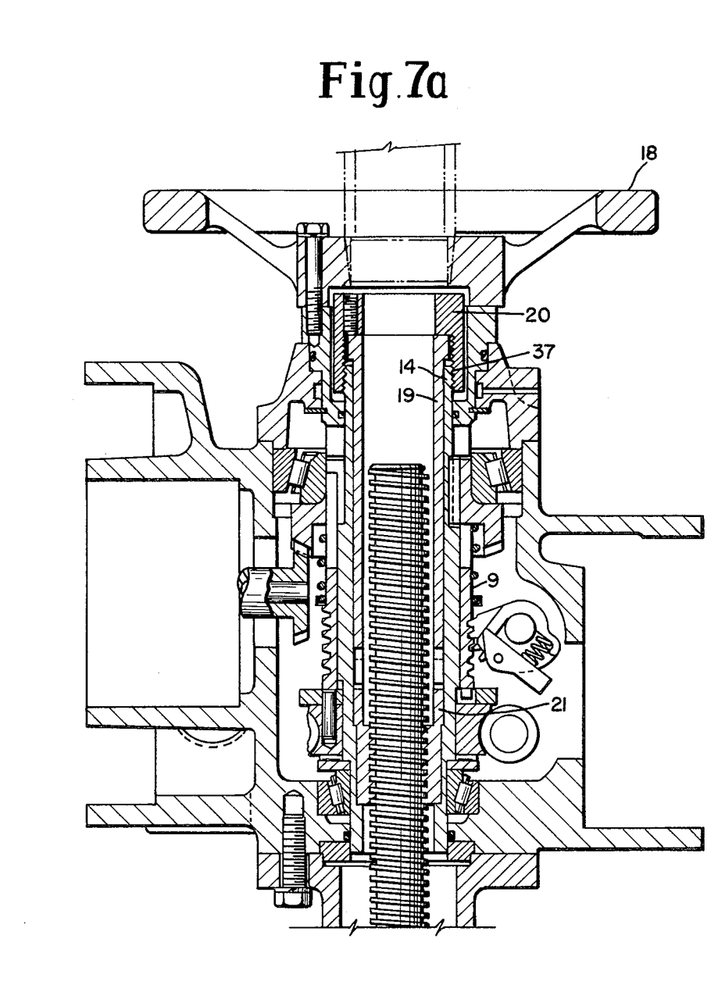
FIGS. 7a-7d illustrate the various steps for removing the stem nut of the actuator in accordance with the present invention.
Figure 7B:
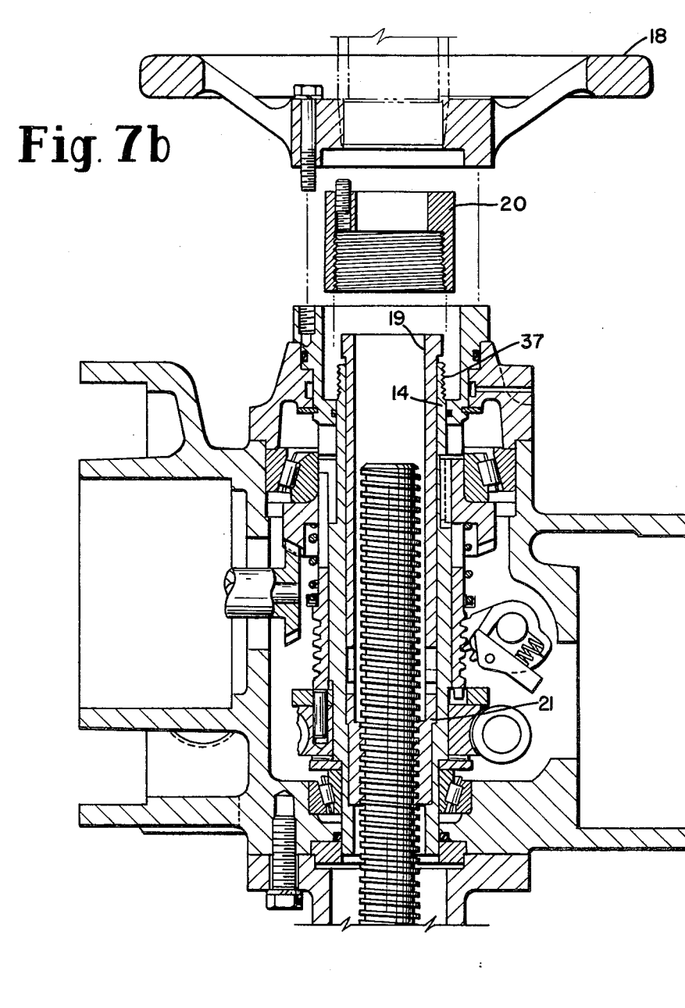
Figure 7C:
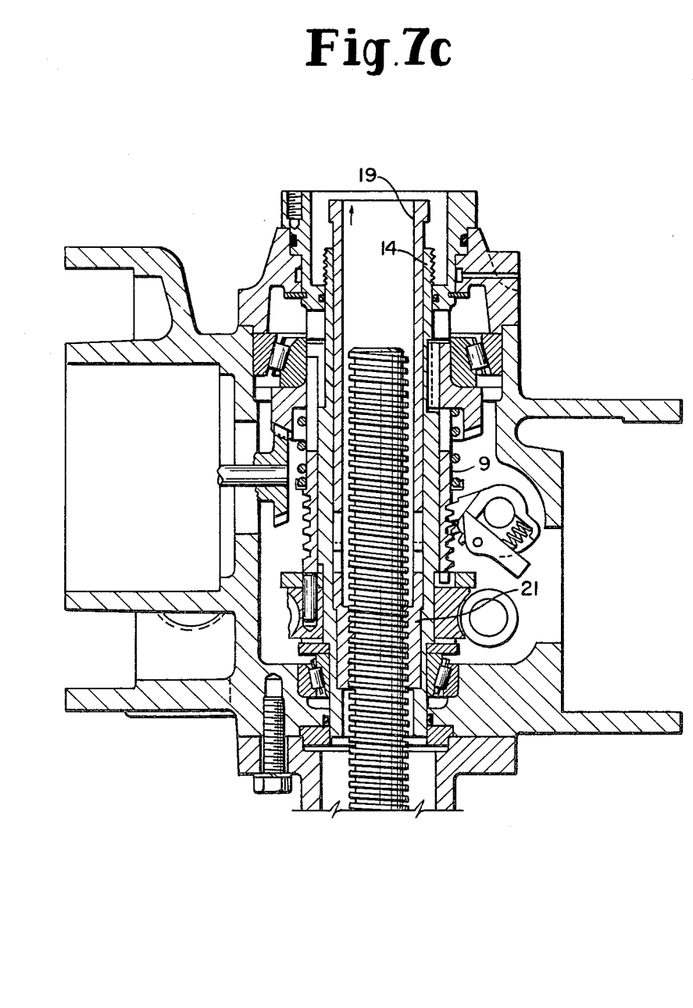
Figure 7D:
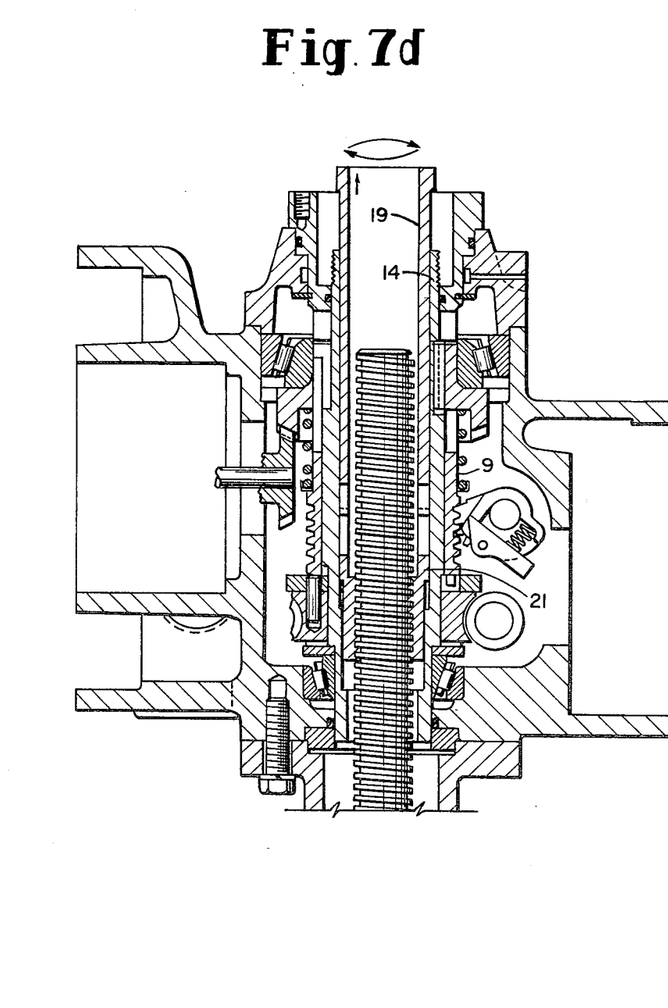

A declutching operation is carried out whenever the rotational movement of eccentric drive ring 7 ceases and the clutch is to be moved by the hand wheel. As pinion 24 and shaft 23 are rotated by declutching knob 27, as shown in FIG. 5, a tripper cartridge 28 is simultaneously rotated. Attached to tripper cartridge 28 by a pin 29 is a tripper member 30. With the rotation of cartridge 28, tripper member 30 is simultaneously rotated until it comes into engagement with the top surface of eccentric drive ring 7, generally resting on such drive ring. Tripper member 30 is spring biased by a spring 31 so that it remains in its position resting on top of eccentric drive ring 7 until the drive ring 7 is rotated. When eccentric drive ring 7 is rotated, eccentric cam surface 39 acts to push tripper member 30 off of eccentric drive ring 7 thereby enabling spring 35 to return the clutch sleeve 9 to its first position.

Having now described the various elements of the rotary actuator, a description of the operation of such actuator is set forth below. Such description includes both the normal operation of the rotary actuator when it is controlled by the electric drive motor and the declutching operation which enables the actuator to be controlled by the hand wheel when necessary.

Motor shaft member 32 coupled to motor 2 drives worm shaft 4 through a set of gears 3. Worm shaft 4 rotates worm 5, which is keyed to the worm shaft. Worm 5 drives worm gear 6 which is free to rotate over drive sleeve 14. Securely fastened to the upper surface of the worm gear is ring member 8 having two pins located 180° apart. Worm gear 6 rotates eccentric 7 through ring member 8. Eccentric 7 has machined in its inside diameter two keyway slots located 180° apart and approximately 90° from the pins of the pin member 8. Eccentric 7 drives a clutch sleeve 9 through two face lugs 10 and keyway slots in the inside diameter of eccentric 7.

Bevel gear 12 also mounted around the drive sleeve 14 has machined into its inside diameter two keyway slots which are located 180° apart. Clutch sleeve 9 has machined on its surface two male lugs 11 and 13, which are fitted inside the keyway slots of the bevel gear 12. Clutch sleeve 9 drives bevel gear 12 by means of the two male lugs and the keyway slots on the inside diameter of the bevel gear. Clutch sleeve 9 is spring loaded in the downward direction and against eccentric 7 by spring 35.

Bevel gear 12 is keyed and hence serves to rotate drive sleeve 14. Drive sleeve 14 rotates driver 19 through two slots in its upper surface and two mating lugs on driver 19. Driver 19 drives a stem nut 21 by means of its two lower lugs and upper slots on stem nut 21. A stem nut 21 drives the drive rod that passes through it.

The rotary actuator contains a semi-automatic clutching mechanism in that the actuator is switched, or declutched, manually from an electric mode of operation to a manual mode of operation and it is automatically clutched back into an electric mode of operation from the manual mode of operation. In case of a motor failure or during the initial start-up of the valve, the actuator may be operated manually by a hand wheel 18 and the actuator is switched into such manual operation mode by the manual movement of a declutch mechanism.

Rotation of declutch lever 27 clockwise by approximately 90° generates a rotational movement of declutch shaft 23, tripper cartridge 28 and clutch pinion 24, which are keyed together. Rotation of approximately 90° of clutch pinion 24 exerts an upward force on clutch sleeve 9 through the gear teeth 22 on the clutch pinion and the corresponding annular ribs machined on the outside diameter of the clutch sleeve. The upward movement of clutch sleeve 9 results in disengagement of its lower face lugs 10 from the internally machined keyway slots of eccentric drive ring 7. The upward movement of the clutch sleeve 9 also results in engagement of its top lugs with the downward facing lugs 16a and 16b of hand wheel adapter 17. Hand wheel adapter 17 is securely fastened to hand wheel 18.

The purpose of tripper 30, tripper cartridge 28, pin piece 29 and compression spring 31 is to hold clutch sleeve 9 in its upward position, where it engages with lugs 16a and 16b of hand wheel adapter 17 for enabling the manual mode of operation. In the normal motor mode of operation, the tripper cartridge and the tripper are rotated approximately 90° counterclockwise so as to keep the tripper away from the rotating eccentric. However, for the manual mode of operation, the declutch knob is rotated approximately 90° clockwise along with the declutch shaft and the tripper cartridge. Rotation of declutch knob 27, declutch shaft 23 and tripper cartridge 28 moves tripper 30 upwards and away from eccentric drive ring 7 and simultaneously the tripper pivots. When the declutch knob is released, spring 36 pushes clutch sleeve 9 downward rotating pinion 24 counterclockwise so that the tripper seats on the top surface 39 of the eccentric drive ring.

The actuator will remain in the manual mode of operation until the motor is energized at which time the following tripping operation occurs. When the motor 2 is energized, motor shaft 32 causes the rotation of worm gear 6 which rotates eccentric drive ring 7. In rotating eccentric drive ring 7, its stepped cam surface "C" pushes the "E" side surface of tripper 30 thereby moving it out of the hand wheel mode position.

Clutch sleeve 9 by means of the force exerted by spring 35 is now free to be pushed downward thereby disengaging its upper lugs from engagement with lugs 16a and 16b on hand wheel adapter 17. Further downward movement of clutch sleeve 9 results in engagement of its lower face lugs 10 with the internal keyway slots on eccentric drive ring 7 at which time the motor mode is reentered.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. An actuator comprising:
    a drive motor;
    an output member capable of receiving an output drive rod;
    drive means including a worm wheel mounted around said output member and freely rotatable relative thereto, said worm wheel being arranged so as to be rotated by said drive motor, and a driving portion mounted on said worm wheel for transmitting power from said worm wheel to said output member;
    coupling means for transmitting rotational movement of said output member to an output drive rod, said coupling means including a driver and a stem nut, said driver and said stem nut being arranged within and coupled to said output member and said stem nut being capable of being attached to an output drive rod to be driven by said actuator;
    clutch means mounted on said output member at a location adjacent said drive portion for rotation therewith but being axially movable along said output member, said clutch means having lug members at one end capable of engaging said drive portion and having extension members at its other end coupling said clutch means to said output member so that said clutch means couples said output member to said drive portion of said drive means when said clutch means is arranged in a first position in which said lug members of said clutch means engages said drive portion of said drive means;

bias means for normally biasing said clutch means into its first position;

declutch means capable of causing said clutch means to be moved into a second position so that said lugs are moved out of engagement with said drive portion if rotation of said driving portion ceases;

retaining means for retaining said clutch means in its second position until resumption of rotation of said driving portion, said retaining means including a tripper member that rests upon said driving portion when said clutch means is in its second position; and, said driving portion including deactivating means for automatically deactivating said declutch means upon resumption of rotation of said driving portion and enabling said clutch means to return to its first position.

2. An actuator according to claim 1 wherein an output drive rod to be driven is externally threaded and said said stem nut is internally threaded and the output drive rod passes through and is in engagement with said stem nut.

3. An actuator according to claim 2 wherein said driver is directly connected to said output member and said stem nut and transmits power therebetween.

4. An actuator according to claim 1, 2 or 4 wherein said clutch means in its first position is in engagement with said driving portion, said driving portion has an eccentric section on its upper surface facing said clutch means, said declutch means moves said clutch means out of engagement with said driving portion and as said clutch means moves said tripper member is brought into engagement with said upper surface of said driving portion adjacent said eccentric section, and said tripper member when engaged with said upper surface of said driving portion prevents said clutch means from returning to its first position.

5. An actuator according to claim 4 wherein said eccentric section forces said tripper member out of engagement with said driving portion when said driving portion is rotated thereby allowing said bias means to return said clutch means to its first position.

6. An actuator according to claim 5 wherein said driving portion rotates when said drive motor rotates so that said tripper member only retains said clutch means in its second position when operation of said drive motor is terminated and said tripper member will be forced out of engagement with driving portion as soon as said drive motor is reactivated so that said clutch means is automatically returned to its first position.

7. An actuator according to claim 2 further comprising a hand wheel coupled to said output member at the longitudinal end opposite the end from which said output drive rod extends, said hand wheel being capable of rotating said output member when the operation of said drive motor is terminated.

8. An actuator according to claim 7 further comprising hand wheel adapter means for connecting said hand wheel to said clutch means when said clutch means is in its second position so that said clutch means in turn couples said hand wheel to said output member.

9. An actuator according to claim 7 or 8 wherein said stem nut is removable from said output member from the end of said output member where said hand wheel is attached.

10. An actuator according to claim 9 wherein said stem nut can be removed with the aid of said driver and without any need to rotate said output drive rod.

11. An actuator according to claim 9 wherein once said stem nut is removed it can be replaced with a stem nut having a different inner diameter of its internally threaded surface so as to accommodate a different output driver rod.

12. An actuator comprising:
a drive motor providing a rotational output;
a threaded drive rod having a free output end capable of being coupled to a member to be actuated;
a worm wheel coupled to the output of said drive motor so as to be rotated by said drive motor;
drive means for coupling rotational movement of said worm wheel to said threaded drive rod, said drive means including: a drive sleeve; a driving member having an internally threaded portion for coupling it to said threaded drive rod and said driving member being arranged within said drive sleeve; said threaded drive rod passing through said driving member and being arranged so as to extend from one longitudinal end of said drive sleeve; and clutch means for coupling said worm wheel to said drive sleeve so as to rotate said drive sleeve and in turn rotate said driving member and said threaded drive rod;

a hand wheel being capable of being coupled to said drive means at the other longitudinal end of said drive sleeve opposite the end from which said threaded drive rod extends;

said driving member being removable from said drive sleeve at the end thereof where said hand wheel is attached after removing said hand wheel without any need for rotation of said threaded drive rod.

13. An actuator according to claim 12 wherein said worm wheel has a drive portion capable of having said clutch means coupled thereto for rotating said clutch means when said clutch means is in a first position and further comprising bias means for normally biasing said clutch means into its first position.

14. An actuator according to claim 13 further comprising hand wheel adapter means for connecting said hand wheel to said clutch means when said clutch means is moved into a second position out of engagement with said drive portion of said worm wheel.

15. An actuator according to claim 14 further comprising: declutch means capable of causing said clutch means to be moved into a second position out of engagement with said drive portion of said worm wheel and into engagement with said hand wheel adapter means and retaining means for retaining said clutch means in its second position if rotation of said drive portion ceases and until resumption of rotation of said drive portion.

16. An actuator according to claim 15 wherein said retaining means includes a tripper member that rests upon said drive portion when said clutch means is in its second position.

17. An actuator according to claim 16 wherein said driving portion includes deactivating means capable of automatically deactivating said declutch means and enabling said clutch means to return to its first position.

* * * * *

UNITED STATES PATENT AND TRADEMARK OFFICE
CERTIFICATE OF CORRECTION

PATENT NO. : 4,393,965

DATED : July 19, 1983

INVENTOR(S) : John Zouzoulas

It is certified that error appears in the above-identified patent and that said Letters Patent is hereby corrected as shown below:

Claim 4, change "claim 1, 2 or 4" to --claim 1, 2 or 3--.

Signed and Sealed this

Third Day of January 1984

[SEAL]

Attest:

GERALD J. MOSSINGHOFF

*Attesting Officer*  *Commissioner of Patents and Trademarks*